Figure 1:
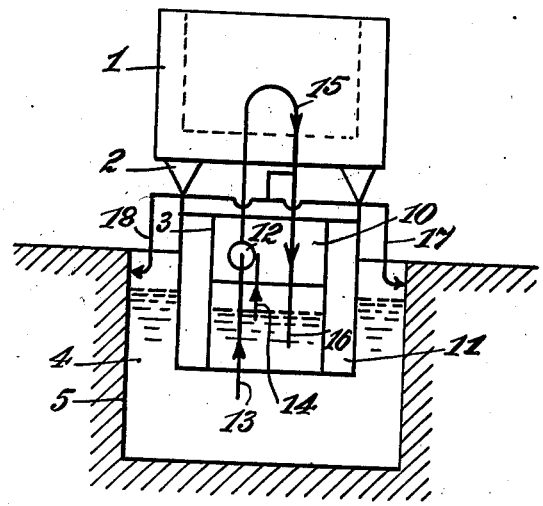

Dec. 22, 1942.                J. WOTSCHKE                 2,305,823
        VESSEL FOR TREATING MATERIALS IN THE CHEMICAL
                  AND METALLURGICAL INDUSTRY
                     Filed Jan. 8, 1940

INVENTOR.
                     BY   Johannes Wotschke
                              C. P. Goepel
                              his ATTORNEY Patented Dec. 22, 1942

2,305,823

UNITED STATES PATENT OFFICE 2,305,823

VESSEL FOR TREATING MATERIALS IN THE CHEMICAL AND METALLURGICAL INDUSTRY

Johannes Wotschke, Berlin-Dahlem, Germany; vested in the Alien Property Custodian Application January 8, 1940, Serial No. 312,812
In Germany December 20, 1938

2 Claims. (Cl. 266—1)

The present invention relates to vessels used for carrying out chemical and metallurgical processes and more particularly refers to a vessel serving for the reception of heavy loads of materials to be treated by such chemical and metallurgical processes. As a rule ores, metals, stones and earths are treated in such vessels in a wet state or by the application of heat. The present invention in a high degree is independent on such kinds of treatment as well as on the contents of the vessel and also on the form or the shape of the vessel, so that the invention may advantageously be used for various technical purposes.

A preferred construction of the invention consists in using together with the vessel a head acting upon the contents of the vessel. Under the expression "head" an arrangement, similar to that used in the construction of machine tools and mounted above the vessel, is to be understood in which various operating members, as electrodes, agitators, scrapers, pipes for withdrawing gases, supply pipes and other members, are mounted which during operation selectively may be introduced into the material to be treated and be employed to heat and agitate the material, and to free the latter from slags etc. In the head used according to the invention the operating members are mounted in tight bearings so that they may be lifted only or be rotated for instance in the case of the blades of an agitator. To use the operating members the freely movable vessel performs the necessary movement with regard to the operating members.

In this manner not only a far more accurate control of the operation and of all movements of the vessel is obtained, but several treatments may simultaneously be carried out in the most simple manner. In particular, the material is advantageously rendered homogeneous by the invention.

Moreover, for performing at least one kind of movement of the vessel a liquid preferably is used as driving medium, whereby simultaneously a suitable cooling of the driving gear is obtained.

According to one modification of the invention, the movement of the vessel in all directions is rendered possible by using a float, having a controllable buoyancy, for supporting and moving such vessels, said float being movably arranged in a tank containing a liquid. In accordance with the most simple construction the lower portion of the vessel itself is formed as a float. Physically considered the float according to the invention is a ship carrying as load the vessel. This floating vessel may quickly and slowly be lifted and lowered as desired by influencing the buoyancy conditions of the float. Moreover, in any desired position of height the vessel may completely be rotated and swung and tilted around a large angle respectively with uniform ease. Due to this novel arrangement the vessel may also simultaneously perform two or even three movements. For instance with the use of rather simple means the vessel may during tilting be lifted and if desired also rotated. By means of the invention, therefore, a support for a vessel is provided the upper portion of which, being of particular importance for the manipulation, not only is freely accessible and is also movable in all directions, but in which, moreover, gears, at least gears arranged in the operating space, are completely dispensed with. In all operating conditions the vessel practically may be so treated as being weightless. Consequently the vessel may be loaded to any desired degree.

The invention will be further described, embodiments shown in the drawing, and finally pointed out in the claims.

In the accompanying drawing some constructions of the invention are shown by way of example.

Figures 2, 3:
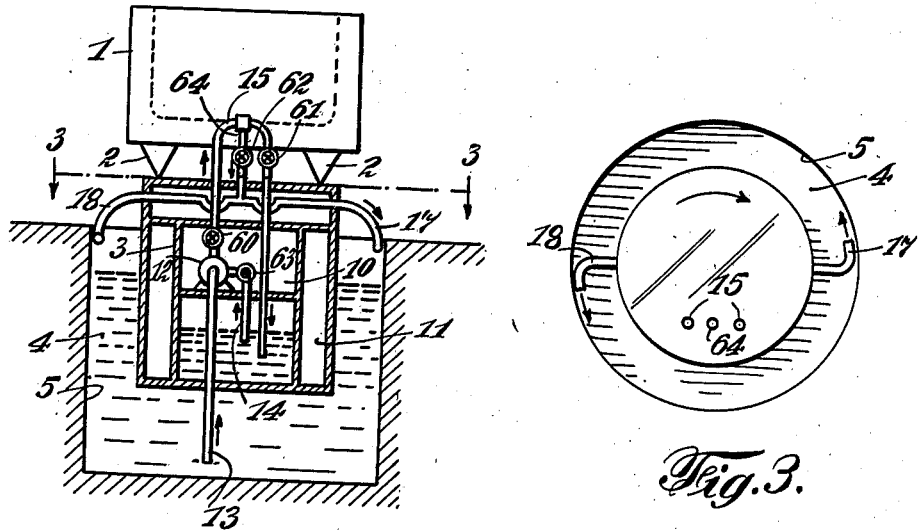

In the drawing:

Fig. 1 is a view of a vessel which is hydraulically mounted and in which the float is constructed in a special manner, Fig. 2 is a similar view showing the parts in detail, and Fig. 3 is a plan view seen from the section line on line 3—3 of Fig. 2.

According to Fig. 1 the vessel 1 is connected to the float 3 by means of supporting members 2. The float 3 being movably arranged in the liquid 4. According to this example the pump chamber 10 is arranged within the float 3 in the middle of the closed gas chambers 11. The pump 12 which is accessible from above withdraws liquid 4 from the container 5 by way of the pipe 13. A second point of suction 14 may selectively be used. The pressure pipe behind the pump contains one or more cooling pipes 15. The return pipe for the cooling medium is designated with 16. The pump may also be used in the manner of a Segner-water wheel for rotating the float and thereby the vessel. For this purpose openings 17 and 18 are provided which discharge into the liquid of the container tangentially to the horizontal cross section of the float. The rotation is effected in a particularly simple manner if the vessel simultaneously is lifted or lowered. If the pump 12 draws in liquid for instance at 14 from the liquid contents of a closed float and if the liquid fed is discharged at 17 and 18, the float is lifted and simultaneously rotated. In this manner the power of the pump is not only repeatedly utilized but the operation is also ensured at a lower suction capacity i. e. in a manner saving power. The liquid container may also be utilized for storing considerable quantities of heat.

In Figure 2 the parts shown in Figure 1, are shown in greater detail, with pipe 64, and valves 60, 61, 62 and 63, the arrows showing the direction of flow.

In Figure 3, the top view shows the ends 17 and 18, and pipe 15, with pipe 64, with the arrows showing the direction of movement.

Various embodiments have been shown, but changes may be made therein without departing from the spirit of the invention as defined in the annexed claims.

What I claim is:

1. In apparatus of the class described, including a vessel for treating metals, ores and earths in the chemical and metallurgical industry adapted to be moved in all directions, the combination of a liquid container, liquid engaging means on the underside of said vessel adapted to be buoyed by the liquid in said container, to enable said means to tilt in respect to the level of said liquid, means for raising and lowering the liquid level in said container to move said vessel vertically, and means for rotating said liquid engaging means to thereby rotate said vessel.

2. In apparatus of the class described, including a vessel for treating metals, ores and earths in the chemical and metallurgical industry, the combination of a container for liquid, means in said container arranged on the underside of said vessel buoyed by the liquid therein, said last named means being movable in the liquid to any tilting position, means for raising and lowering the liquid level in said container to move said vessel vertically, means for tilting said vessel, and means for rotating the vessel.

JOHANNES WOTSCHKE.